United States Patent [19]

Dustmann

[11] Patent Number: 4,688,132
[45] Date of Patent: Aug. 18, 1987

[54] SUPERCONDUCTING MAGNET SYSTEM FOR OPERATION AT 13K

[75] Inventor: Cord-Henrich Dustmann, Weinheim, Fed. Rep. of Germany

[73] Assignee: BBC Aktiengesellschaft Brown, Boveri & Cie, Baden, Switzerland

[21] Appl. No.: 701,941

[22] Filed: Feb. 15, 1985

[30] Foreign Application Priority Data

Feb. 15, 1984 [DE] Fed. Rep. of Germany ....... 3405310

[51] Int. Cl.$^4$ .............................................. H02H 7/10
[52] U.S. Cl. ..................................... 361/19; 361/141; 335/216
[58] Field of Search .................... 361/19, 141; 335/216

[56] References Cited

U.S. PATENT DOCUMENTS

| 3,363,207 | 1/1968 | Brechna | 335/216 |
| 3,568,002 | 3/1971 | Robins | 361/141 |
| 3,848,162 | 11/1974 | Ichikawa et al. | 361/141 |
| 4,559,576 | 12/1985 | Ries | 361/19 |

FOREIGN PATENT DOCUMENTS

| 0074030 | 3/1983 | European Pat. Off. |
| 18018652 | 2/1971 | Fed. Rep. of Germany |
| 1564722 | 2/1971 | Fed. Rep. of Germany |
| 2546198 | 5/1976 | Fed. Rep. of Germany |
| 3027616 | 2/1982 | Fed. Rep. of Germany |
| 1230579 | 5/1971 | United Kingdom |

OTHER PUBLICATIONS

"Design of the BPA Superconducting 30 MJ Energy Storage Coil" by Hoffmann et al. *IEEE Transaction of Magnetics* vol May-17 No. 1, Jan.-1981.

*Electrical Engineering*, Feb. 1962, Syracuse, New York R. McFee: "Applications of Superconductivity to the Generation and Distribution of Electric Power" pp. 122-129.

*Revern Science Instrumental*, vol. 46, No. 5 May 1975 T. Bernat et al: "Automated Flux Pump for Energizing High Current Superconducting Loads" pp. 582-585.

IEEE Transactions on Magnetics, vol. MAG-19, No. 3, May 1983, IEEE New York, US M. O. Hoenig: "Design Concepts for a Mechanically Refrigerated 13 K Superconducting Magnet System" pp. 880-883.

IEEE Transactions on Magnetics, vol. MAG-17, No. 5, Sep. 1981, IEEE, New York, US M. A. Green: "Quench Protection and Design of Large High Current Density Superconducting Magnets" pp. 1793-1798.

*Cyrogenics*, vol. 13, No. 6, Jun. 1973, London, New York, Suilford K. Carroll: "Behaviour of a Flux Pump using an Automatic Superconducting Switch" pp. 353-360.

*Cryogenics*, vol. 13, No. 9, Sep. 1973, London, New York, Suilford R. Stevenson: "50 kG Gas Cooled Superconducting Solenoid Operated at 13 K" pp. 524-525.

*Cyrogenics*, vol. 21, No. 4, Apr. 1981, London, New York, Suilford L. Klundert et al.: "Fully Superconducting Rectifiers and Fluxpumps, Part 1: Realized Methods for Pumping Flux" pp. 195-206.

*Cyrogenics*, vol. 21, No. 5, May 1981, London, New York, Suilford L. Klundert et al.: "On Fully Superconducting Rectifiers and Fluxpumps, A Review, Part 2: Commutation Modes, Characteristics and Switches" Seiten 267-277.

*Crogenics*, VOL. 16, NO. 8, AUG. 1976, London, New York, Suilford C. Delage et al.: "Versatile High Performance Helium Cryostat With Vapor Cooled Shields" pp. 483-486.

*Primary Examiner*—A. D. Pellinen
*Assistant Examiner*—Derek S. Jennings
*Attorney, Agent, or Firm*—Herbert L. Lerner; Laurence A. Greenberg

[57] ABSTRACT

A superconducting magnet system includes a cryostat having a cold shield, a superconducting magnet coil disposed in the cold shield, a two-stage cryogenerator connected to the magnet coil for cooling the magnet coil to an operating temperature substantially between 10 and 13K, and a flux pump connected to the magnet coil for feeding current to the magnet coil, the flux pump including a transformer having primary and secondary windings and superconducting switches having conductors, and the magnet coil, windings and conductors being formed of superconducting material having a high critical temperature.

18 Claims, 6 Drawing Figures

SUPERCONDUCTING MAGNET SYSTEM FOR OPERATION AT 13K

BACKGROUND OF THE INVENTION

1. Field of the Invention

The invention relates to a superconducting magnet system with a superconducting magnet coil disposed in a cryostat with a cold shield, the magnet being formed of a material having a high critical temperature such as niobium/tin filaments embedded in a bronze matrix or niobium carbonitride films applied to carrier fibers, and the magnet coil being cooled to an operating temperature of about 10 to 13 K. by a two-stage cryogenerator.

2. Description of the Related Art

Such a magnet system has become known from the publication "IEEE Transactions on Magnetics", Vol. MAG-19, No. 3, May '83, pages 880 to 883. A superconducting coil made with $Nb_3Sn$ conductors is described therein. The coil is operated in the temperature range between 12 and 14 K. It is cooled through heat conduction by a two-stage refigenerator operating according to the Gifford-McMahon process. Therefore, no auxiliary coolants are required. The lowest attainable temperature of such a cryogenerator is about 10 K. At this temperature, however, the apparatus is no longer able to furnish a cooling output worth mentioning, so that a higher operating temperature such as near 13 K. must be selected. At this temperature, a superconductor having an $Nb_3Sn$ basis carries an adequately high current to produce coils for magnetic fields up to 3 or 4T. Superconductors having an NbCN basis also meet such a condition. The coil itself is thermally coupled to the second stage of the cryogenerator, whereas a cold shield for reducing thermal radiation ia attached to the first stage. Since no coolant (e.g. helium) is used, the current leads cannot be cooled by exhaust gas as usual. They are isothermally coupled to both stages of the cryogenerator so that cooling takes place through thermal conduction. In order to keep the heat losses as small as possible, the current in the leads must be kept to a minimum.

In the known prior art device, the leads consume a substantial part of the available cooling capacity and yet limit the maximally possible current density in the magnet coil. The reason for this is that no arbitrarily thin superconducting wires can be used for the magent coil. In the $Nb_3Sn$ technique, for example, no economic method is known for producing superconductors with stabilizing copper and a diameter smaller than 0.8 mm. This is because, when drawing down to smaller diameters, there is the danger of damaging the required tantalum diffusion barrier between the superconductor and the stabilizing copper. However, the stabilizing copper is needed for the safe operation of the magnet coil. This leads to a situation wherein the superconducting wires of the magnet coil are able to carry a relatively large current which may be as high as several hundred amperes. However, such a large current would cause such high heat losses in the leads that the cooling capacity of the cryogenerator would be insufficient.

In order to be able to produce a magnetic field of 3 to 4T despite the limitation of the operating current of the current leads, a magnet coil having more windings than would be necessary based on the current carrying capacity of the superconducting wires could be used. This leads to an increased coil weight. However, the coil weight is limited by the cryogenerator selection because the cryogenerator's cold head must be in a position to support the coil weight and because, in addition, the thermally coupled coil mass should be coolable within a reasonable period of time, e.g. 1 to 3 days. This results in a weight limitation for the coil of 50 to 60 kg. An optimal coil construction is not possible for these reasons.

According to the state of the art, the cryogenerator cold head is disposed in the center of the coil so that this space is no longer available as a usable volume. However, many applications require the coil interior as a usable volume.

SUMMARY OF THE INVENTION

It is accordingly an object of the invention to provide a superconducting magnet system for operation at 10 to 13 K., which overcomes the hereinafore-mentioned disadvantages of the heretofore-known devices of this general type, in which the current carrying capacity of the magnet coil superconductor can be utilized optimally and in which the cryogenerator cooling capacity is predominantly available to cool the magnet coil while the cooling capacity needed for the current leads is greatly reduced in comparison with conventional systems. The enumerated disadvantages of known devices are to be avoided.

With the foregoing and other objects in view there is provided, in accordance with the invention, a superconducting magnet system, comprising a cryostat having a cold shield, a superconducting magnet coil disposed in the cold shield, a two-stage cryogenerator connected to the magent coil for cooling the magnet coil to an operating temperature substantially between 10 and 13 K., and a flux pump connected to the magnet coil for feeding current to the magnet coil, the flux pump including a transformer having primary and secondary windings and superconducting switches having conductors, and the magnet coil, windings and conductors being formed of superconducting material having a high critical temperature, such as niobium-tin filaments embedded in a bronze matrix or niobium-carbonitride films applied to carrier fibers.

The construction and operation of a flux pump are described in the two articles in "Cryogenics" 21, pages 195 to 206 and pages 267 to 277 (1981). However, such a flux pump cannot be applied directly to the present case because of the relatively high operating temperature of about 13 K. Rather, a superconducting material must be used for the flux pump having a critical temperature which is above approximately 13 K.

By using a flux pump with a transformer, at a current transformation ratio of e.g. 1:100, it is possible to attain an operating current of 150 ampere so that a current density can be selected which is an optimum for the coil, while the current leads must carry a current of only 1.5 A, corresponding to a very low thermal cryogenerator load through the current leads.

Advantageous features of the invention are suggested for the flux pump structure:

1. The primary transformer winding of the flux pump is made of very thin $Nb_3Sn$ wire. The wire diameter is e.g. 0.1 mm. This is possible because copper stabilization of the superconducting wire can be omitted due to the very low energy which must be stored in the primary winding.

2. Heat drains, in particular insulated copper wires thermally coupled to the second cryogenerator stage, are placed between the winding layers of the primary and/or secondary transformer windings of the flux pump. This assures intensive cooling of the transformer. By using copper wires aligned parallel to the coil axis, for instance, but not in mutual electrical contact, eddy current losses such as occur when using sheet metal heat drains, can be avoided.

3. The secondary coil of the flux pump transformer is made of the same superconducting wire or rope as the magnet coil. The wire has external copper stabilization (copper coating). The diameters of the secondary coil wire and the magnet coil wire are optimized for the amperage required.

4. At least one of the superconducting switches is made of the same superconducting material as the magnet coil. The stabilizing copper is removed in the switch area (e.g. by etching). A switch heater, e.g. in the form of a constantan heating coil, is disposed in this area. The term "switch area" is understood to mean the wire section which, when heated, goes from the superconducting to the normal-conducting state, with resistance increasing to the point where no current worth mentioning can flow.

5. In the switch area the stabilizing copper is replaced by an electrically highly resistive material, in order to increase the thermal capacity. Such a material is a copper-nickel alloy, for example. The highly resistive material can be applied electrolytically, for instance.

6. The secondary winding and at least one superconducting switch of the flux pump are made of a superconduting, continuous wire. This makes it possible to omit a contact or soldering point between the secondary winding and the superconducting switch. Production-wise, the secondary transformer winding can be wound and one end is pulled out of the winding. At this free end, the copper stabilization is removed in a given area and, if applicable and desired, it is replaced by an electrically highly resistive material. The switch heater is also provided in this area.

7. The secondary winding, at least one superconducting switch of the flux pump, and the magnet coil are made of a superconducting, continuous wire or rope. In this construction, another contact or soldering joint can be obviated as compared to the construction described in item 6. The magnet coil and the secondary winding are wound of a continuous wire or rope. In the area between the magnet coil and the secondary winding, the copper stabilization is removed and a switch heater is provided. This area then serves as a superconducting switch.

8. The flux pump is disposed in a cylindrical aluminum housing which is thermally coupled to the second cryogenerator stage. This measure enables good cooling of the flux pump and avoids heating through heat radiation.

9. The aluminum housing wall is slotted in such manner than eddy currents are largely avoided. For example, a cylindrical aluminum housing may have slots which run parallel to the cylinder axis and which give the housing surface a meander shape as seen in a developed view, described below.

Besides the embodiments of the invention concerning the flux pump, in accordance with another feature of the invention, there is provided an aluminum cylinder of purest aluminum enclosing the magnet coil.

This measure can support the objective of the invention because the high operating current there results an optimally high current density in the magnet coil, so that the coil weight is minimized. An $Nb_3Sn$ coil is produced, for instance, by the "wind-and-react" method (winding the coil wire, annealing and conversion into the superconducting alloy) and is vacuum impregnated, the coil being enclosed in a cylinder of the purest aluminum.

In accordance with a further feature of the invention, the cryogenerator includes first and second stages, and the second stage is connected to the aluminum cylinder for good thermal conduction.

Therefore, due to the good heat conductivity of the purest aluminum at the lowest temperatures, the entire coil is uniformly well cooled all around at minimal temperature differences. It is possible in this way to attain optimal coil cooling with a light weight aluminum cylinder.

In accordance with an added feature of the invention, the aluminum cylinder is constructed in the form of a quench tube by selecting at least one of the geometric configuration thereof e.g. its wall thickness and slot configuration, and/or the alloy from which it is made.

The quench tube principle is described in the publication "IEEE Transactions on Magnetics", Vol. MAG 17, September 1981, page 1793. According to this principle, no impermissible currents are induced when the coil is being energized, whereas the aluminum cylinder acts like the secondary coil of a transformer during the quick current change of the quench, protecting the magnet coil from overheating by absorbing the energy displaced by it. On one hand, the electrical resistance of the aluminum cylinder must not be too small because otherwise current would flow in it upon the energization of the magnet coil. On the other hand, the electrical resistance must not be too great either, because otherwise reliable quenching is not assured. When selecting the aluminum cylinder shape, its wall thickness and/or alloy can be appropriately adjusted on one hand, and on the other hand it may also have recesses, e.g. slots, which result in a lenghtening of the conductor strip for the induced current.

Due to structuring the aluminum cylinder as a quench tube, the copper coating of the coil wire can be at least partly dispensed with, because reliable quenching is now largely taken over by the aluminum cylinder. This makes it possible to reduce the coil weight further without the need for reducing the current density at the same time.

In accordance with an additional feature of the invention, the magnet coil has a cylindrical bore formed therein, and the cryogenerator and flux pump are disposed outside the cylindrical bore.

According to the state of the art (IEEE Transactions on Magnetics, Vol. MAG 19, No. 3, May '83, pages 880 to 883), the cryogenerator cold head is disposed in the center of the coil so that this space is no longer available as a usable volume. However, many applications require the coil interior as a usable volume. This requirement can be met according to this feature of the invention. For instance, the cryogenerator and the flux pump can be flanged to the outer surface of the aluminum cylinder of the magnet coil. As an alternative, the flux pump with the transformer and switches may also be disposed at one end or surface of the aluminum cylinder as an extension of the magnet coil, the aluminum cylinder being slotted axially in this area to avoid eddy currents.

In accordance with again another feature of the invention, the cryogenerator includes first and second stages and the cold shield of the cryostat, in which the magnet coil and/or the flux pump are disposed, is connected to the first stage for good thermal conduction.

If the cryogenerator cold head cannot support the coil weight by itself, in accordance with a concomitant feature of the invention, there are provided means formed of poor thermally conducting material for suspending the magnet coil, the magnet coil being kept in place at least partially by the suspending means.

Other features which are considered as characteristic for the invention are set forth in the appended claims.

Although the invention is illustrated and described herein as embodied in a superconducting magent system for operation at 13 K., it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENT

Figure 1:
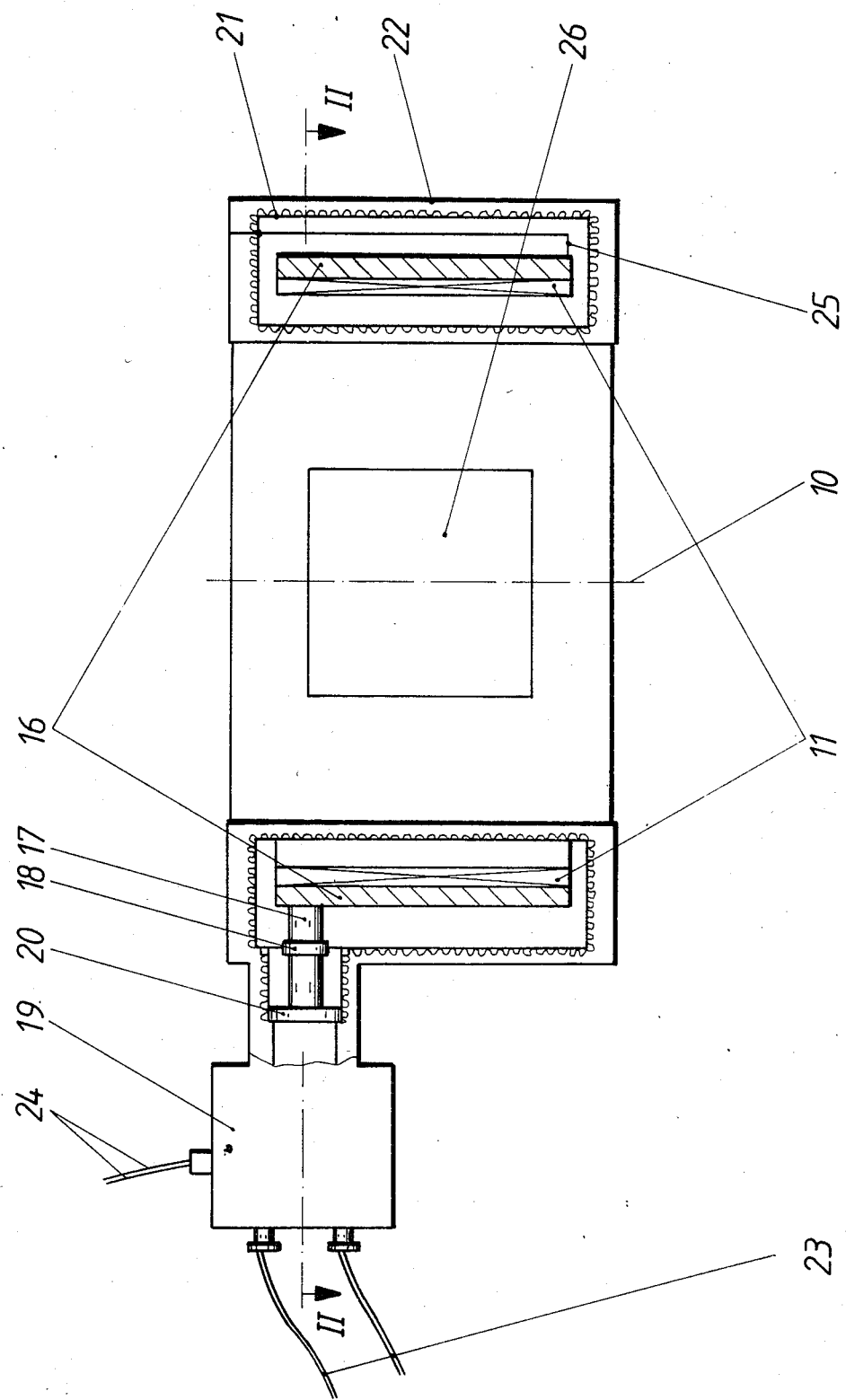
FIG. 1 is a diagrammatic partially side-elevational and partially longitudinal-sectional view of a superconducting magnet system with a flux pump and a cryogenerator.
Figure 2:
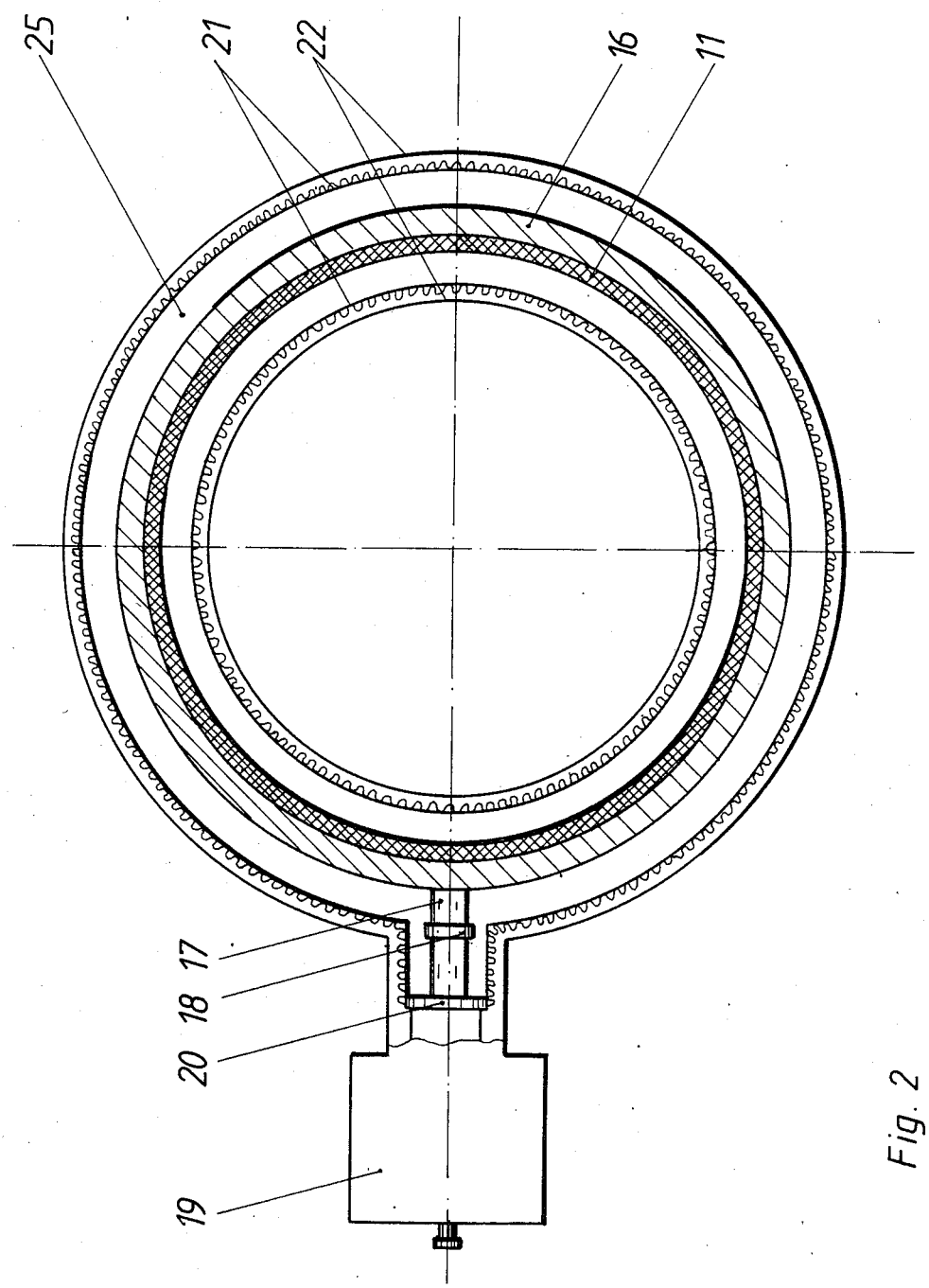
FIG. 2 is a partially side-elevational and partially cross-sectional view taken along the line II—II in FIG. 1 in the direction of the arrows.

Referring now to the figures of the drawings in detail and first particularly to FIGS. 1 and 2 thereof, there is seen a superconducting magnet system with a flux pump and a cryogenerator. In FIG. 1, the coil apparatus and the flux pump are shown in a longitudinal section while the cryogenerator is only shown in side view.

Figure 5:
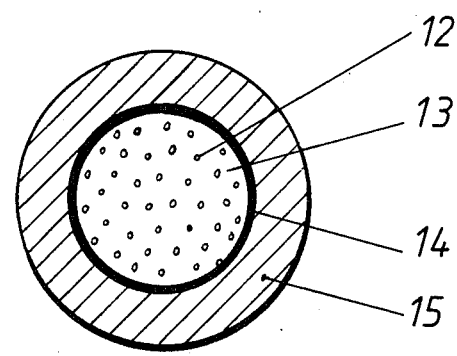
FIG. 5 is a cross-sectional view of a superconducting wire formed of $Nb_3Sn$ filaments with copper stabilization or a constantan resistive layer.

FIGS. 1 and 2 show a vacuum-impregnated magnet coil 11 formed of $Nb_3Sn$ conductors that is wound concentrically around a coil axis 10, while FIG. 5 shows the conductor cross section of the coil wire. FIG. 5 shows $Nb_3Sn$ filaments 12 embedded in bronze 13. The bronze 13 is enclosed by a tantalum layer or barrier 14 which, in turn, is covered by a layer 15 formed of copper in the coil 11 or a constantan resistive layer in order to form a switch heater, which will be discussed in more detail below. When the superconducting wire is annealed during its manufacture, the tantalum barrier prevents contamination of the copper wire 15 formed of highly pure copper by diffusion from the active bronze part of the superconductor, which serves to stabilize the superconductor.

According to FIG. 1, the magnet coil 11 is encased in an aluminum cylinder 16 formed of highly conductive aluminum. The aluminum cylinder 16 is connected to the magnet coil 11 with good thermal conduction, and it carries the weight of the magnet coil 11. In the upper region of the aluminum cylinder 16, a housing 17 of a flux pump is flanged to the outside of the cylinder 16. The flux pump housing 17 is in turn connected to the second stage 18 of a cold head 19 of a cryogenerator having a first stage 29 which is thermally coupled to a cold shield 21 that completely encloses both the flux pump and the magnet coil 11. The magnet coil 11, the flux pump, and the cryogenerator cold head 19 are contained in a vacuum tank 22. Two helium pressure lines 23 which connect the cold head 19 to a non-illustrated compressor come out of the housing of the cryogenerator cold head 19. Two current leads 24 which feed in current for energizing the magnet coil 11, also come out of the cold head housing. The control lines for the superconducting flux pump switches are not shown.

One side of each of the aluminum cylinder 16 and the magnet coil 11 is mechanically supported by the cold head 19. In order to support the other side, two titanium strips 25 are provided, which suspend the aluminum cylinder 16 from the vacuum tank 22. The titanium strips are poor thermal conductors and they are fastened to the lowe part of the aluminum cylinder 16 in order to make the heat transfer between the aluminum cylinder 16 and vacuum tank 22 more difficult, due to the greater length. The magnet assembly has a cylindrical bore 26 formed therein which can be utilized as a usable magnetic volume.

Figure 3:
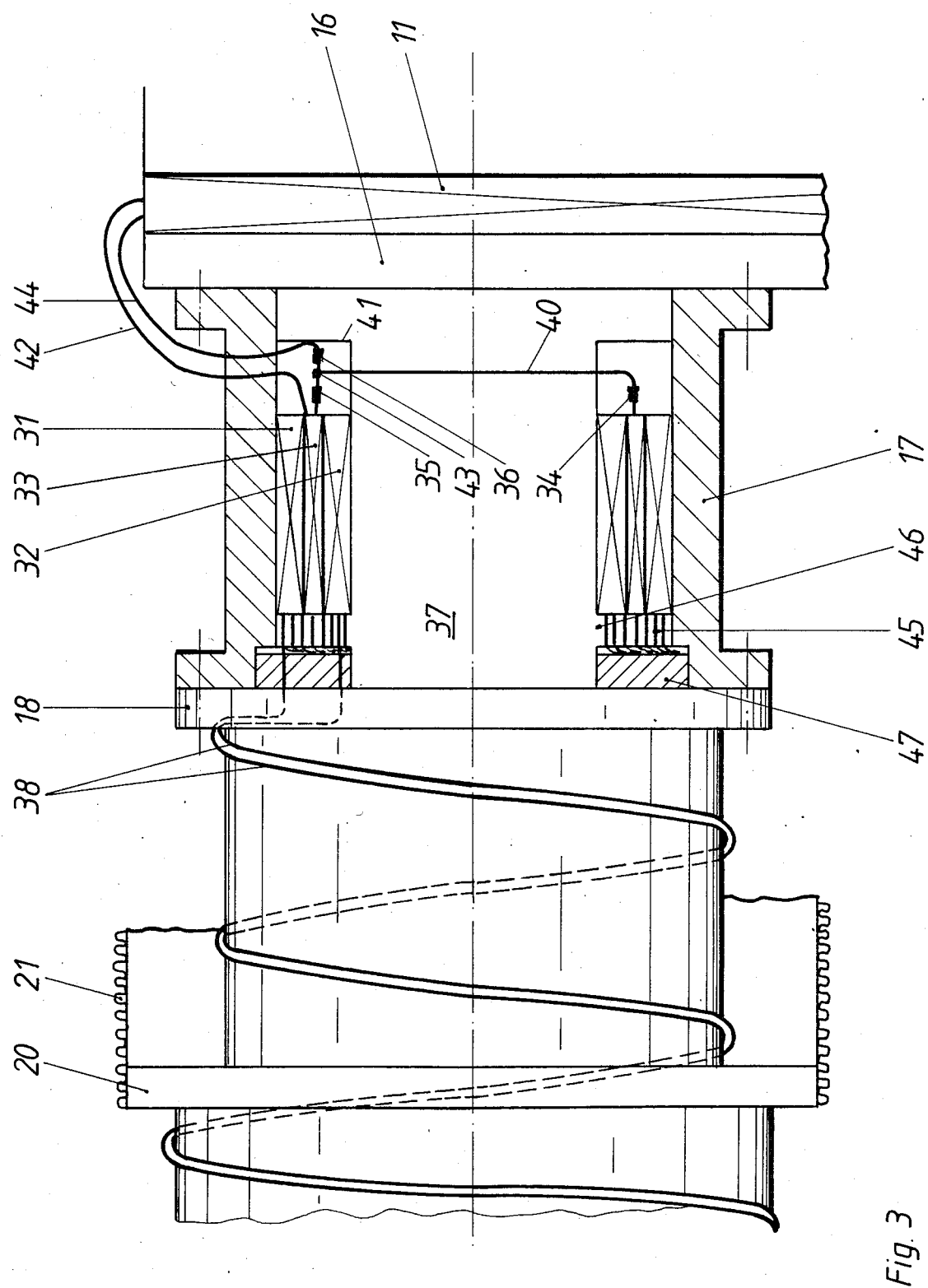
FIG. 3 is a fragmentary longitudinal sectional view of the flux pump apparatus of FIG. 1, on an enlarged scale.
Figure 4:
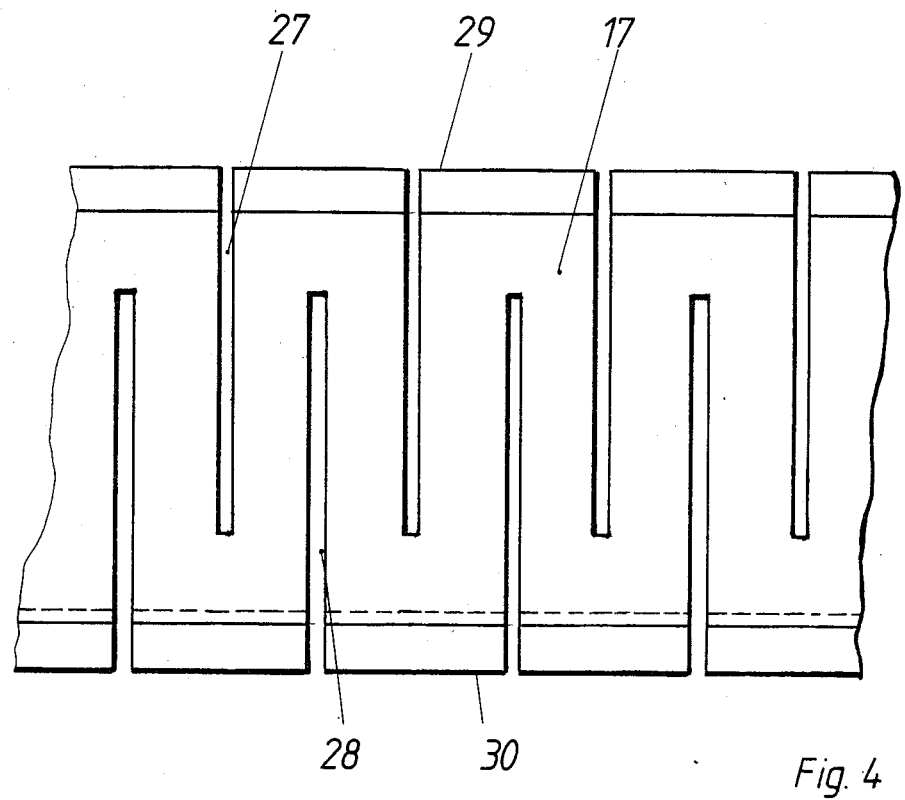
FIG. 4 is a fragmentary developed view of a slotted aluminum housing.

FIG. 3 is a more detailed portion of FIG. 1 on a larger scale showing the flux pump area. The flux pump is housed in the aluminum housing 17 flanged to the aluminum cylinder 16 which supports the magnet coil. The aluminum housing 17 is cylindrical. The aluminum housing 17 is axially slotted in order to prevent eddy current losses therein. The configuration of the slots 27, 28 may be seen in FIG. 4 which is a developed view of the aluminum housing 17. The slots 27, 28 emanate from the respective faces 29, 30 of the aluminum housing 17.

The flux pump is formed of a primary winding 31, 32, a secondary winding 33, and three superconducting switches 34, 35, 36. The windings 31, 32, 33 are wound about a cylindrical form 37. The primary winding 31, 32 is bipartite and the secondary winding 33 is an intermediate wound layer in a neutral zone of the primary winding 31, 32. The primary winding 31, 32 is connected to a non-illustrated power supply through current leads 38. The current leads 38 are wound on the second stage 18 and the first stage 20 of the cold head 19 of the cryogenerator and are in good thermal contact therewith. The primary winding 31, 32 is made of very thin $Nb_3Sn$ wire.

The secondary winding 33 of the transformer has two coil end wires 40, 41 and a center tap line 42. In one portion of one coil end wire 40, the copper stabilization is removed and replaced by an electrically highly resistive material. This portion is enclosed by a constantan wire 15 as shown in FIG. 5, which serves as a heating wire. This portion is thus constructed as superconducting switch 34. In the other coil end wire 41, two separate superconducting switches 35, 36 are constructed in the same manner as the superconducting switch 34. At a contact point 43, located between the two superconductive switches 35 and 36, the coil end wire 40 is connected to the coil end wire 41.

The secondary coil 33 of the flux pump is connected to the magnet coil 11 through a free end 44 of the coil end wire 41 and the center tap wire 42. Only two contact points are needed to produce the magnet coil 11, the secondary winding 33, and the superconducting switches 34, 35, 36. One contact point lies between the two superconducting switches 35 and 36 and the other is required at the center tap of the secondary winding 33. It should be noted that the magnet coil 11, the secondary winding 33, and the superconducting switches 34, 35, 36 can be made of a continuous, superconducting wire or rope with copper stabilization.

In order to cool the transformer, which is formed of the primary winding 31, 32 and the secondary winding 33, axially oriented copper rods 45 are wound between the individual winding layers. These copper rods protrude out of the end surface of the transformer and are pushed through recesses formed in a flange 46 of the winding form 37. The copper rods 45 are bent outside of the flange 46 and are brought into thermal contact with the aluminum housing 17 by a pressure ring 47.

Figure 6:
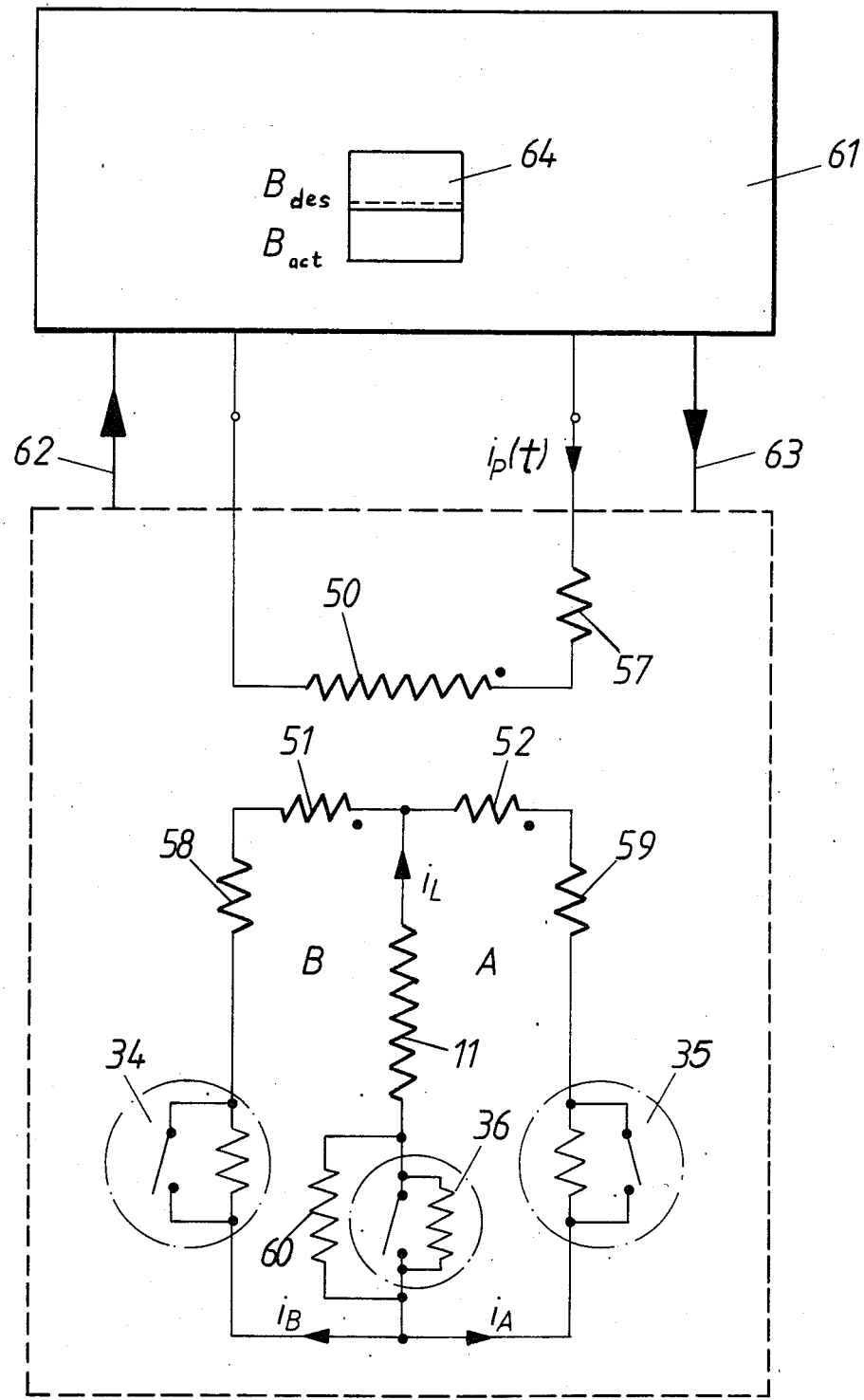
FIG. 6 is an equivalent schematic circuit diagram for a flux pump apparatus.

FIG. 6 shows an equivalent circuit diagram of the flux pump. Flux pumps of this kind have been described in two articles in the publication "Cryogenics" 21, pages 195 to 206 and 267 to 277 (1981). As is already evident from FIG. 3, the flux pump is essentially formed of a transformer with a superconducting primary inductance 50, a superconducting secondary inductance 51, 52, three superconducting switches 34, 35, 36 and the superconducting magnet coil or load inductance 11. Leakage inductances 57, 58, 59 of the primary inductance 50 and of the secondary inductance 51, 52 are also shown in the equivalent circuit diagram of FIG. 6.

The superconducting switches are shown symbolically. The switches are essentially formed of a superconducting conductor heatable by a heating coil. When cooled, this conductor is superconducting; when heated, it is normally conducting and has a finite resistance.

The two superconducting switches 34 and 35 serve for pumping up the load current $i_L$ of the load inductance 11. The superconducting switch 36 is a protective element for the load inductance 11. The switch 36 is closed if the load inductance 11 is completely in the superconducting state. However, if the load inductance 11 at least partly reverts to the normally-conductive state, the productive switch 36 opens, due to the heating of the appropriate conductor section. The current flow in the load inductance circuit 11 is conducted through a protective resistor 60 and is limited by the resistor 60 ao that the load inductance 11 is prevented from being damaged by the normally-conductive area being heated.

The flux pump is controlled by a controller 61. The controller 61 detects the state of the flux pump (e.g. temperature, load current $i_L$, state of the superconducting switches), through sensing wires 62. The controller 61 affects the flux pump, especially the superconducting switches 34, 35, 36, through control lines 63.

The controller 61 is preset by a setting knob 64 to a desired induction $B_{des}$ chosen for the usable volume 26 shown in FIG. 1. Furthermore, the actual induction $B_{act}$ is measured in the usable volume 26 and is fed to the controller 61. The primary current $i_p(t)$ and the state of the superconducting switches 34, 35, 36 are set in accordnace with a desired/actual comparison.

The foregoing is a description corresponding in substance to German application P 34 05 310.7, filed Feb. 15, 1984, the International priority of which is being claimed for the instant application and which is hereby made part of this application. Any material discrepancies between the foregoing specification and the aforementioned corresponding German application are to be resolved in favor of the latter.

I claim:

1. Superconducting magnet system, comprising a cryostat having a cold shield, a superconducting magnet coil disposed in said cold shield, a two-stage cryogenerator connected to said magnet coil for cooling said magnet coil to an operating temperature substantially between 10 and 13 K., and a flux pump connected to said magnet coil for feeding current to said magnet coil, said flux pump including a transformer having primary and secondary windings and superconducting switches having conductors, said magnet coil, windings and conductors being formed of superconducting material having a high critical temperature, said secondary winding and at least one of said superconducting switches of said flux pump being formed of a continuous superconducting wire, at least one of said superconducting switches being part of said superconducting material of said magnet coil, said superconducting material having stabilizing copper disposed thereon being removed at said at least one switch, and a switch heater replacing said stabilizing copper at said at least one switch.

2. Magnet system according to claim 1, wherein said material having a high critical temperature is in the form of niobium and tin filaments embedded in a bronze matrix.

3. Magnet system according to claim 1, wherein said material having a high critical temperature is in the form of niobium carbonitride films applied to carrier fibers.

4. Magnet system according to claim 1, wherein said primary winding is formed of thin $Nb_3Sn$ wire.

5. Magnet system according to claim 1, wherein said cryogenerator includes first and second stages, said windings include layers, and including heat drains in the form of copper wires inserted between said layers of at least one of said windings and thermally coupled to said second stage.

6. Magnet system according to claim 1, wherein said secondary coil and said magnet winding are formed of the same superconducting wire.

7. Magnet system according to claim 1, wherein said switch heater is a constantan coil.

8. Magnet system according to claim 1, including an electrically highly resistive material disposed on said superconducting material in place of said stabilizing copper at said at least one switch for increasing heat capacity.

9. Magnet system according to claim 6, wherein said secondary winding, at least one of said superconducting switches and said magnet coil are formed of a continuous superconducting wire.

10. Magnet system according to claim 1, wherein said cryogenerator includes first and seocnd stages, and including a cylindrical aluminum housing thermally coupled to said second stage, said flux pump being disposed in said housing.

11. Magnet system according to claim 10, wherein said housing has a wall having slots formed therein for preventing eddy currents.

12. Magnet system according to claim 1, including an aluminum cylinder enclosing said magnet coil.

13. Magnet system according to claim 12, wherein said cryogenerator includes first and second stages, and said seocnd stage is connected to said aluminum cylinder for good thermal conduction.

14. Magnet system according to claim 12, wherein said aluminum cylinder is constructed in the form of a quench tube by selecting at least one of the geometric configuration thereof and the alloy from which it is made.

15. Magnet system according to claim 13, wherein said aluminum cylinder is constructed in the form of a quench tube by selecting at least one of the geometric configuration thereof and the alloy from which it is made.

16. Magnet system according to claim 1, wherein said magnet coil has a cylindrical bore formed therein, and said cryogenerator and flux pump are disposed outside said cylindrical bore.

17. Magnet system according to claim 1, wherein said cryogenerator includes first and second stages and said cold shield of said cryostat is connected to said first stage for good thermal conduction.

18. Magnet system according to claim 1, including means formed of poor thermally conducting material for suspending said magnet coil, said magnet coil being kept in place at least partially by said suspending means.

* * * * *